US010743674B2

(12) United States Patent
Klimm et al.

(10) Patent No.: US 10,743,674 B2
(45) Date of Patent: Aug. 18, 2020

(54) ELECTROMOTIVE DUAL DRIVE

(71) Applicant: DewertOkin GmbH, Kirchlengern (DE)

(72) Inventors: Hartmut Klimm, Bünde (DE); Heinrich Dück, Espelkamp (DE); Christian Müller, Rahden (DE)

(73) Assignee: DewertOkin GmbH, Kirchlengern (DE)

( * ) Notice: Subject to any disclaimer, the term of this patent is extended or adjusted under 35 U.S.C. 154(b) by 63 days.

(21) Appl. No.: 15/557,382

(22) PCT Filed: Mar. 11, 2016

(86) PCT No.: PCT/EP2016/055363
§ 371 (c)(1),
(2) Date: Sep. 11, 2017

(87) PCT Pub. No.: WO2016/146547
PCT Pub. Date: Sep. 22, 2016

(65) Prior Publication Data
US 2018/0112750 A1 Apr. 26, 2018

(30) Foreign Application Priority Data
Mar. 13, 2015 (DE) .................... 20 2015 101 316 U

(51) Int. Cl.
*A47C 20/04* (2006.01)
*A47C 20/08* (2006.01)
(Continued)

(52) U.S. Cl.
CPC .......... *A47C 20/042* (2013.01); *A47C 20/041* (2013.01); *A47C 20/08* (2013.01);
(Continued)

(58) Field of Classification Search
CPC ..... A47C 20/041; A47C 20/042; A47C 20/08; F16H 2025/2043; F16H 2025/2046;
(Continued)

(56) References Cited

U.S. PATENT DOCUMENTS 5,075,911 A * 12/1991 Dewert ................ A47C 20/041
5/616
6,269,707 B1 * 8/2001 Koch .................... A47C 20/041
297/362.14

(Continued)

FOREIGN PATENT DOCUMENTS

DE         100 47 037        1/2002
DE    20 2004 020 384        6/2005
(Continued)

OTHER PUBLICATIONS

International Search Report issued by the European Patent Office in International Application PCT/EP2016/055363 dated May 11, 2016.

*Primary Examiner* — Joseph Brown
(74) *Attorney, Agent, or Firm* — Henry M. Feiereisen LLC

(57) ABSTRACT

An electromotive dual drive for adjustment of two different furniture parts of a piece of furniture includes a housing having opposite end sections. Each end section is formed with a shaft holder for receiving a pivot shaft of the piece of furniture. Two drive units are arranged one behind another in the housing in a longitudinal direction, with each drive unit including a drive motor, a transmission, and a spindle drive including a spindle which acts on an output member operably connected to a respective one of the pivot shafts. The spindles and/or the output members of the drive units are sized of different lengths, and the drive motor of one of the drive units and the drive motor of the other one of the drive units are spaced from the shaft holders, respectively, at different distances.

11 Claims, 10 Drawing Sheets

(51) Int. Cl.
*F16H 25/20* (2006.01)
*F16H 57/03* (2012.01)
*A47C 19/02* (2006.01)
*F16H 57/02* (2012.01)

(52) U.S. Cl.
CPC ......... *F16H 25/2015* (2013.01); *F16H 57/03* (2013.01); *A47C 19/025* (2013.01); *F16H 25/20* (2013.01); *F16H 2025/209* (2013.01); *F16H 2025/2031* (2013.01); *F16H 2025/2043* (2013.01); *F16H 2025/2084* (2013.01); *F16H 2057/02034* (2013.01)

(58) Field of Classification Search
CPC ....... F16H 2025/2084; F16H 2025/209; F16H 2025/2463; F16H 2025/02034; F16H 25/2015; F16H 57/03
USPC .......................................... 74/89.23, 424.71
See application file for complete search history.

(56) References Cited

U.S. PATENT DOCUMENTS

| | | | | |
|---|---|---|---|---|
| 7,849,756 | B2 | 12/2010 | Minning et al. | |
| 8,534,147 | B2 | 9/2013 | Roither et al. | |
| 9,236,822 | B2 | 1/2016 | Hille et al. | |
| 2002/0036421 | A1* | 3/2002 | Bangert | A47C 20/041 297/316 |
| 2003/0172756 | A1* | 9/2003 | Dewert | A47C 20/041 74/89.23 |
| 2004/0169408 | A1* | 9/2004 | Dewert | A47C 20/041 297/285 |
| 2004/0262587 | A1* | 12/2004 | Dewert | A47C 20/041 254/133 R |
| 2008/0121852 | A1* | 5/2008 | Koch | A47C 20/041 254/100 |
| 2008/0234612 | A1* | 9/2008 | Koch | A61H 15/0078 601/100 |
| 2008/0271246 | A1* | 11/2008 | Nielsen | A47C 20/041 5/616 |
| 2009/0044340 | A1* | 2/2009 | Nielsen | A47C 20/041 5/618 |
| 2009/0100951 | A1* | 4/2009 | Frost | A47C 20/041 74/22 A |
| 2009/0151490 | A1* | 6/2009 | Kristensen | F16H 25/2015 74/89.37 |
| 2010/0170356 | A1* | 7/2010 | Schmid | A47C 20/041 74/89.14 |
| 2010/0224017 | A1* | 9/2010 | Nielsen | A47C 20/041 74/89.23 |
| 2010/0313690 | A1* | 12/2010 | Nielsen | A47C 20/041 74/102 |
| 2011/0100141 | A1* | 5/2011 | Inoue | F16H 25/2015 74/25 |
| 2012/0240696 | A1* | 9/2012 | Bastholm | A47C 20/041 74/89.38 |
| 2014/0311265 | A1* | 10/2014 | Duck | F16H 25/20 74/89.23 |
| 2015/0074908 | A1* | 3/2015 | Dewert | A47C 20/041 5/616 |
| 2015/0143934 | A1* | 5/2015 | Wu | A47C 20/041 74/89.29 |
| 2015/0272816 | A1* | 10/2015 | Zhang | A61H 23/02 601/52 |
| 2015/0289665 | A1 | 10/2015 | Klimm | |
| 2016/0017966 | A1* | 1/2016 | Wu | F16H 25/2025 74/89.38 |

FOREIGN PATENT DOCUMENTS

| | | |
|---|---|---|
| DE | 20 2013 101 521 | 6/2013 |
| EP | 1 266 439 | 1/2008 |

* cited by examiner

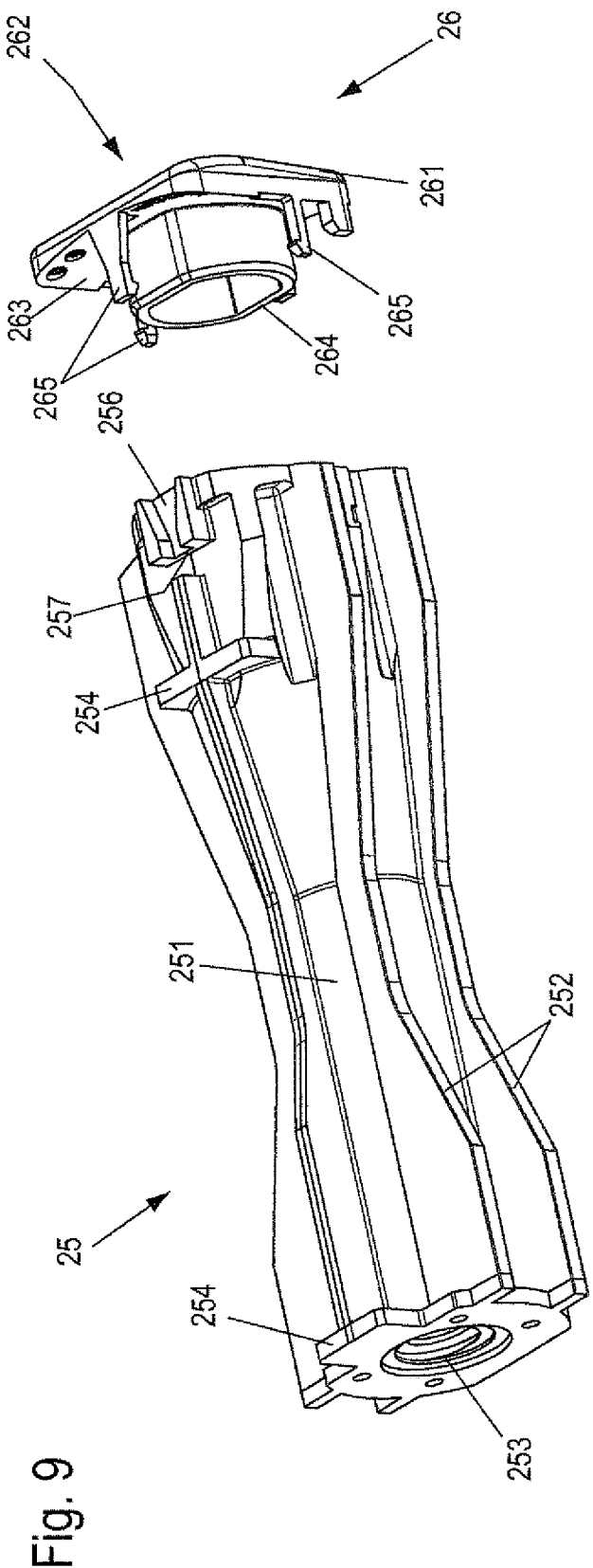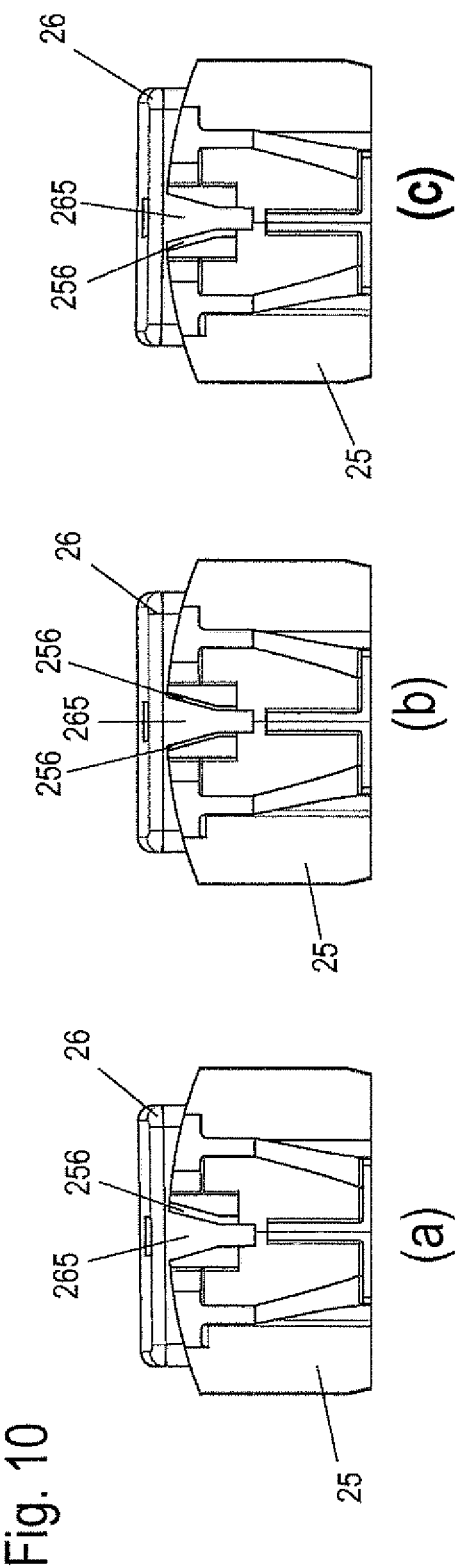
Fig. 9
Fig. 10

ELECTROMOTIVE DUAL DRIVE

CROSS-REFERENCES TO RELATED APPLICATIONS

This application is the U.S. National Stage of International Application No. PCT/EP2016/055363, filed Mar. 11, 2016, which designated the United States and has been published as International Publication No. WO 2016/146547 A1 and which claims the priority of German Patent Application, Serial No. 20 2015 101 316.7, filed Mar. 13, 2015, pursuant to 35 U.S.C. 119(a)-(d).

BACKGROUND OF THE INVENTION

The invention relates to an electromotive dual drive for an adjustment of two different furniture parts of a piece of furniture having two drive units, each of which comprises a drive motor, a transmission and a spindle drive having respective a spindle and acting on an output member. Both drive units are arranged one behind the other in a common housing in the longitudinal direction of the housing. Shaft holders for a respective pivot shaft of the furniture, on which a respective output member acts, are formed on both end sections of the housing which are mutually opposite in the longitudinal direction.

Such electromotive dual drives are used, for example, in order to be able to adjust the head part and the foot part of a slatted frame in an electromotive manner. They can easily be mounted on the furniture, e.g. the aforementioned slatted frame of a bed, by inserting in each case one pivot shaft of the furniture into one of the shaft holders. For this purpose, the shaft holders are usually provided with cover slides, which can be removed in order to be able to insert the pivot shaft into the shaft holder with a pivot lever. After repositioning the cover slides, the entire dual drive is fixed to the shafts. The drive units act independently of one another via their spindle drive and the output member on the respective pivot lever for adjusting the furniture parts.

Such a dual drive is known, for example, from the printed publication EP 1 266 439 B1. In this dual drive, an elongated common housing for the dual drive is provided, wherein both drive units are constructed in a substantially mirror-image manner with respect to a mirror plane which extends perpendicularly to the longitudinal direction of extension centrally through the housing of the dual drive. The drive motors of both drive units lie adjacent to one another in a central section of the housing, wherein the drive spindles face to the outside in alignment with each other. In the respective end section of the dual drive, the output members, which are designed as pressure plates, act on pivot levers of inserted pivot shafts.

In the longitudinal direction, the housing of the dual drive of the printed publication EP 1 266 439 B1 is divided into several sections by this arrangement of the drive units. In addition to the outer end sections through which the pivot shafts extend and in which the pivot levers lie, three sections can be subdivided: a section lying between the motors or reduction gears assigned to them, as well as a respective section located in the region of the spindles. Each of these sections provides the possibility to accommodate electrical and/or electronic components of the electromotive drive in the housing.

In such a design of known dual drives, a control board of the electromotive drive is usually arranged between the motors, and a further circuit board is provided in the area of the spindles, on which end position switches are arranged which are actuated by the output member. If an integrated power supply unit is provided, the transformer of such a power supply unit preferably also finds its place in the area between the motors. A disadvantage of the subdivision of the available space into several sections is the increased production complexity, resulting from the necessity of having to fix several circuit boards in the housing and having to wire them together.

In addition, the described construction is disadvantageous in view of the space requirement of the dual drive during shipping. In the lateral direction, i.e. in the direction of the pivot shafts, the housing is usually formed in a narrow way. The drive motors have an axis of rotation which is parallel to the pivot shafts, wherein the motors project laterally beyond the remaining width of the housing. Motor covers (motor domes) are arranged in the region of the motors in order to accommodate or cover the protruding motors. Both motors face to the same side in order to avoid increasing the lateral projection of the housing even further. If the double drives lie side by side at the same height during dispatch, they need a stacking width which corresponds to their width in the area of the motors. If the motors are rotated in such a way that two respective dual drives with their motors are orientated toward one another, they must be displaced in their longitudinal direction in order to be able to be arranged in a space-saving manner with respect to their width. This arrangement, which is more effective with regard to the width, then leads to an increased space requirement in the longitudinal direction of the drives. The arrangement of two drives which is offset in the longitudinal direction is also disadvantageous with regard to the size of the packaging in the longitudinal direction since the dual drives in the longitudinal direction already have an unwieldy length. Furthermore, it is desirable to use standardized packaging sizes, e.g. on the basis of euro palettes. An arrangement with a significant offset in the longitudinal direction can prevent the use of euro palettes depending on the length of the dual drives.

An electromotive drive is known from the printed publication DE 20 2013 101 521 U1, in which troughs are formed in the housing, so that supplied additional components, such as a remote control for the electromotive drive for example, can be arranged in this trough without them protruding laterally beyond the cover of the motors. In this way, the free space remaining between two dual drives, which is caused by the protruding motor covers, can be used sensibly during the packing and dispatch of the dual drive. However, the fundamental problem still remains in that the width during packaging is essentially determined by the width of the housing in the region of the motors.

SUMMARY OF THE INVENTION

It is therefore an object of the present invention to provide a dual drive of the initially mentioned type in which, on the one hand, the space available within the housing for electrical and/or electronic components can be utilized as effectively as possible and can be packaged as space-saving as possible together with other similar drives.

This object is achieved by an electromotive dual drive having the features of the independent claim. Advantageous embodiments and further developments are specified in the dependent claims.

An electromotive dual drive of the initially mentioned type is characterized in that the spindles and/or the output members of the two drive units are designed with different lengths so that the drive motors are differently spaced apart from the shaft holder assigned to them for the respective pivot shaft.

In the case of dual drives known from the prior art, both drive units are designed with the shortest possible spindle, the length of which is comparable to the shorter of the two spindles in the dual drive according to the invention. As a result, apart from the end regions of the dual drive in which the pivot shafts are accommodated, the interior space of the housing, which is available, is divided into three installation spaces, one each above the spindles and one third installation space between the two drive motors. Correspondingly, the installation space available in the housing according to the prior art is subdivided into three approximately equally large sections, whereas the installation space between the drive motors is reduced according to the invention and at least one of the sections in the area of one of the spindles is thereby enlarged. Preferably, both drive units can be arranged with their drive motors adjacent and at a small distance from each other, as a result of which the installation space between the motors can be dispensed with in favour of a consequently larger space in the area of the extended spindle. Although the overall available space is not increased with the same length of the furniture drive, it is less subdivided, which offers greater freedom of design for the electrical and electronic components to be arranged in these installation spaces.

In the context of the application, the element is to be understood as the spindle which transmits the rotary movement of the drive motor from the transmission into a linear movement of a spindle nut. In addition to a threaded section, the spindle also includes a section between the gear and the threaded section which transmits the rotary movement. In this sense, a spacer element or the like, which is arranged between the transmission and a threaded section, is to be regarded as a part of the spindle. In one embodiment of the spacer element, this can essentially transmit torques when it comprises an interlocking rotational entrainment with the side facing the gearwheel and can compensate for angular errors between the gearwheel and the threaded portion of the spindle. The gearwheels are preferably formed by worm wheels and have a section for a bearing. A worm wheel of a worm gear extending in the axial direction over the actual transmission area is also to be regarded as part of the spindle. The length of the spindle thus determines the maximum possible distance between the transmission and the output member, regardless of whether it is formed in one piece as a shaft with threaded section or a worm wheel section and/or a spacer element and/or a non-threaded section and the threaded section.

A small distance between the drive units is to be understood in particular as such a distance in which the drive units are positioned so close to each other that no or only very narrow components are or can be arranged between them. Very narrow components can, for example, be stiffening ribs of the housing.

A further advantage of the reduction in the spacing of the drive motors is that the drive motors are no longer arranged symmetrically to the centre of the longitudinal side of the housing, but rather off-centre. Correspondingly, covers of the drive motors, which protrude beyond the housing side face, are also arranged off-centre. The off-centre arrangement makes it possible to position two motor drives with respective drive motors, which face one another, within a packaging unit, wherein only a small displacement of the furniture drives relative to one another, or none at all depending on the geometry, needs to take place in the longitudinal direction. Thus, the space created by the protruding motor covers in a packaging unit can be minimized.

It is noted that the reduction in the spacing of the drive motors can be achieved with different lengths of the spindles with the same overall length of the dual drive. Equivalent to this is an embodiment in which the spindles of both drive units are of the same length but the output members such as pressure slides are of different lengths. Combinations of the aforementioned embodiments are also conceivable.

Advantageously, in the case of drive motors that are moved together, a common motor dome can be formed on the housing which covers sections of the two driving motors projecting beyond a side face of the housing. Further preferably, drive shafts of the drive motors can extend in an inclined manner with respect to the side face of the housing in order to reduce an overhang of the motors over the side face as compared to an arrangement in which the drive shafts are perpendicular to the side face.

In a further advantageous embodiment of the electromotive dual drive, a control board is arranged in the larger installation space in the region of the extended spindle or the extended output member. As a result, it is particularly advantageous to insert a single control board on which a power supply unit can optionally also be arranged next to a control device for the drive motors, as a result of which the wiring effort during assembly is reduced. Furthermore, on the control board, end position switches for switching off the drive motors are arranged on the control board when the output members approach the limits of their displacement path, wherein the output members are coupled to the limit switches by means of tow rods. In this way, the wiring effort can be further reduced and separate boards for the end position switches can be dispensed with.

In addition, further modules can additionally be arranged on the control board, e.g. a wireless receiver, memory modules for operating parameters for example or for protocol purposes, or arithmetic units.

In a further advantageous embodiment of the electromotive dual drive, the output members are linearly displaceable between a fully retracted position and a completely extended position, wherein the associated tow rod is deflected from a neutral position into a direction or an opposite direction when approaching the fully retracted position or the fully extended position. The linear sliding movement of the output members, which are designed, for example, as pressure slides which act on the pivot levers of the pivot shafts with a pressure head, can advantageously be transmitted to the tow rods by not co-moving the tow rods permanently with the output members but only when approaching the respective end of the displacement path. Such a coupling can, for example, be achieved mechanically simply in such a way that the tow rods each have a driver, which is co-moved along by the stops on the output members. Advantageously, each tow rod is assigned a restoring spring which moves it back into the neutral position during deflection in each of the possible directions. In a cost-saving and material-saving design, the restoring spring is a W-shaped spring with two spring arms, which is fixed in a central region on the housing. The spring arms engage around a part of the tow rod, e.g. a correspondingly shaped cam, wherein one or the other spring arm pushes the cam back in the direction of the neutral position depending on the direction of the deflection.

In a further advantageous embodiment of the electromotive dual drive, each of the tow rods has switching cams to actuate the end position switches upon deflection. In this case, the switching cams are preferably arranged on one side of the control board and the other sections of the tow rods on the opposite side of the control board. A slot-like recess is provided in the control board in which the tow rods are guided and by means of which the movement of the control rods is transmitted from the one side of the control board to the switching cams on the other side of the control board. The control board thus also assumes the function of guiding the tow rods. In addition, a further guidance of the tow rods can additionally be provided within the housing, preferably by means of elements of the housing, e.g. by stiffening ribs.

BRIEF DESCRIPTION OF THE DRAWING

The invention is explained in closer detail below by reference to an exemplary embodiment shown in the drawings, wherein:

FIG. 9 shows an isometric view of a pressure slide and a pressure head of the furniture drive of FIGS. 1 to 8;

FIG. 10 shows three partial images, each with a top view of a part of the pressure slide with pressure head in different relative positions with respect to each other.

DETAILED DESCRIPTION OF PREFERRED EMBODIMENTS

Figure 1:
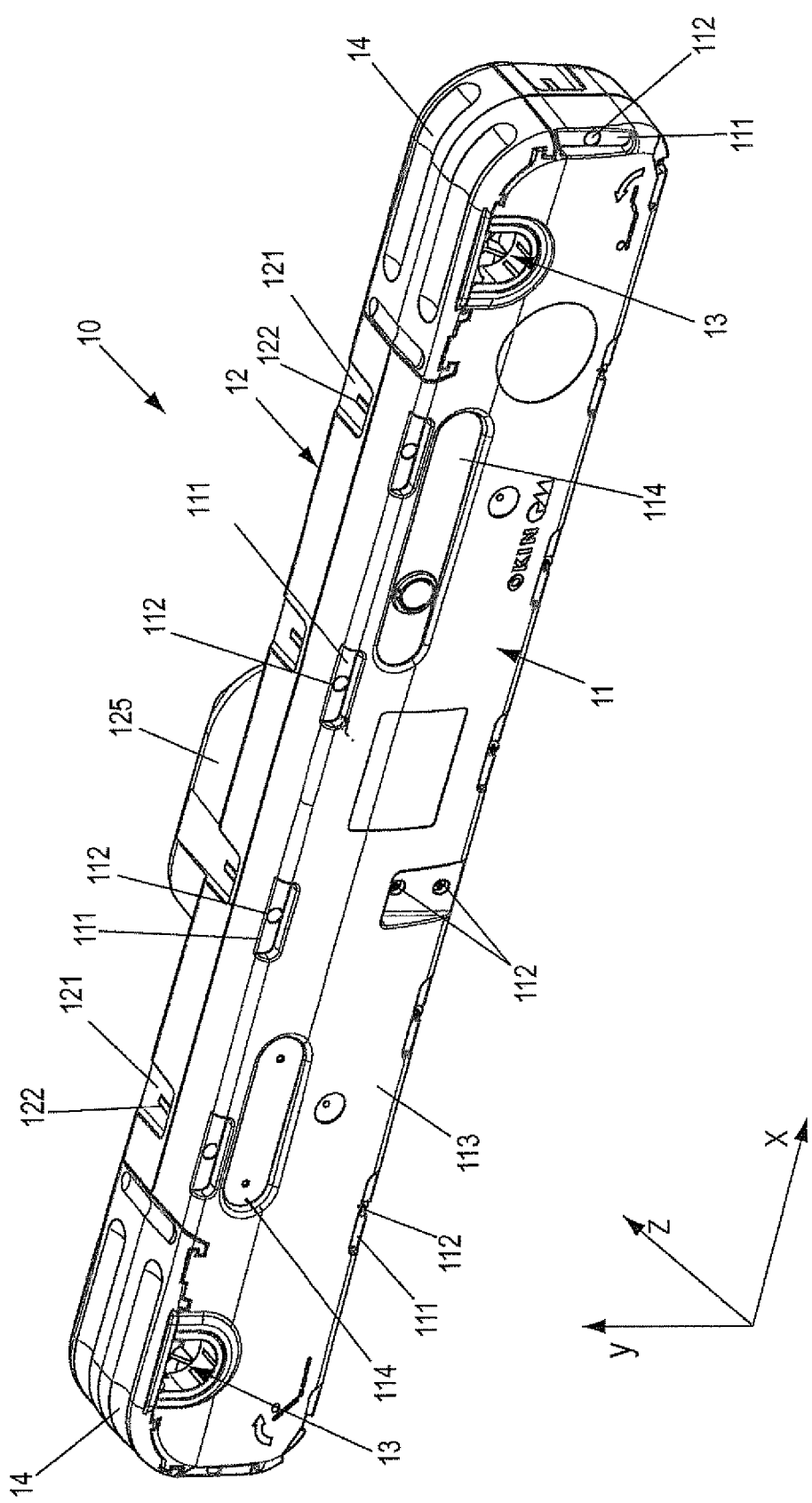
FIGS. 1, 2 each show an isometric view of a furniture drive from two different directions of view.
Figure 2:
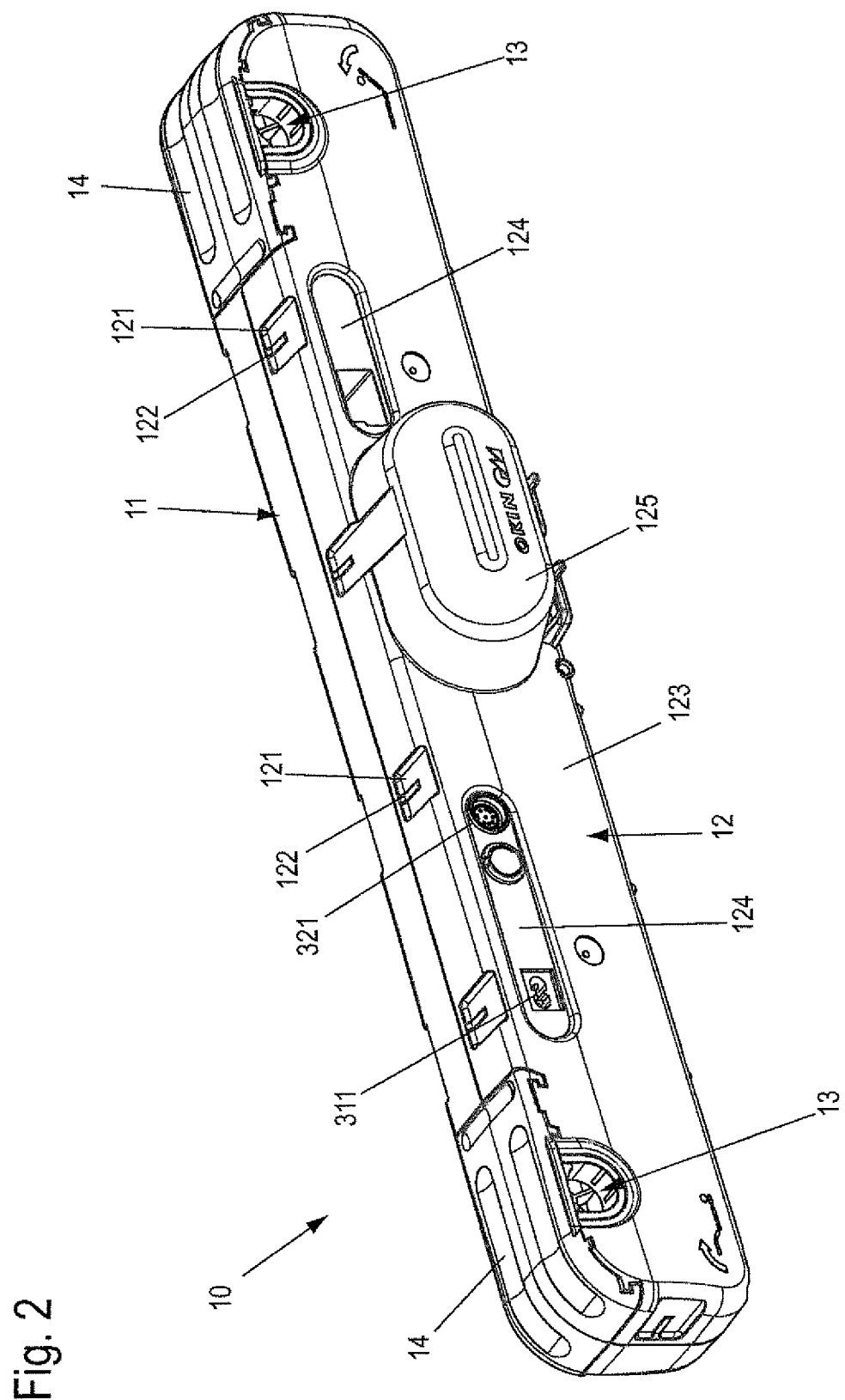

FIGS. 1 and 2 show an exemplary embodiment of a furniture drive according to the invention in an overall isometric view from two different directions of view. In these, as in the following figures, the same reference numerals show the same elements or such with identical action.

The furniture drive has a housing 10 which is essentially parallelepipedic with respect to its basic shape with a longitudinal extension in a first direction, hereinafter referred to as the x-direction, which clearly exceeds the extension in the y- or z-directions perpendicular thereto.

The housing 10 is constructed from two housing half-shells, a first housing half-shell 11 and a second housing half-shell 12, wherein a dividing line extends between the two housing half-shells 11, 12 in the xy-plane. Preferably, the housing half-shells 11, 12 are made of plastic in an injection-moulding process.

The housing 10 illustrated in this exemplary embodiment is bolted to connect its housing half-shells 11, 12. For this purpose, screw holes 112 arranged in clamping recesses 111 and 121 are arranged in the first housing half-shell 11 and screw domes 122 in the second housing half-shell 12. Alternatively, and/or additionally, connecting terminals, which engage over the separating line between the housing half-shells 11, 12 and engage therewith, can be clipped into the clamping recesses 111 and 121. In addition to the screw connections arranged in the clamping recesses 111, 121, further screw holes 112 can be provided, as can be seen, for example, in the lower middle region of the first housing half-shell 11 in FIG. 1.

Slightly recessed connection recesses 114 and 124 are provided on side faces 113 and 123 of the housing 10, in which connections and/or display and operating elements for the electromotive furniture drive are positioned. Even in the case of slightly curved side faces 113, 123, a flat surface is provided within the recesses, which simplifies the arrangement of terminals and operating elements. The connection recesses 114, 124 also protect the connections and display and control elements during transport or mounting.

As is particularly apparent in FIG. 2, a motor dome 125 protrudes on the second housing half-shell 12 over the side face 123. The motor housing 125 covers the motor housing projecting laterally beyond the side face 123, wherein, in the illustrated exemplary embodiment, a single motor dome 125 is provided, which overlaps the housings of two drive motors arranged next to one another.

In addition to a screw connection or clamping of the housing 10, further alternative connection methods are possible, in particular welding, riveting or adhesive bonding of the housing half-shells 11, 12. Welding of housing half-shells 11, 12, which are made of thermoplastic plastic, can be performed in an ultrasonic process. Particularly advantageous is a welding process in which abutment surfaces of the housing half-shells 11, 12 are heated before joining until the plastic material melts at least in a layer near the surface. In a next step the housing half-shells are precisely joined together under the action of force until the plastic has solidified again and has connected to the plastic of the respective other housing half-shell 11, 12. For the exact positioning of the housing half-shell 11, 12 one below the other, webs or pins, which engage into each other or on each other, can be provided on the housing half-shell 11, 12.

For heating the plastic surfaces, radiant heat can be generated by heating elements, e.g. infrared radiators. Alternatively and preferably, a so-called hot-gas or hot-air welding process in which a hot gas is directed precisely onto the connecting points via a nozzle distribution system can be used. One advantage of the welding process by pre-heating the connection points over ultrasonic welding is that connections between the housing half-shells 11, 12 which are located in the interior of the housing can also be formed in a targeted manner. Thus, a connection can be provided in the region of force-absorbing or force-transmitting housing sections in the housing. Such housing sections are provided, in particular, in the area of gears and/or the shaft holder 13. They can also be designed in such a way that they allow a centring or positioning of the housing half-shells 11, 12 among each other.

A further advantageous type of connection is hot riveting. In this method suitable for plastic housing half-shells, bolt-like rivet elements are arranged on one of the housing half-shells, which penetrate corresponding breakthroughs or openings of the other housing half-shells when the housing is assembled. Thereafter, the head of the rivet element is heated in the so-called hot-gas riveting method and pressed with a cold plunger to a rivet head. An advantage in this case is that the geometry of the rivet element can be selected freely. In addition to the bolts mentioned, larger elements can also be used in tongue shape or tab form, which allow a large-area force transmission between the two housing half-shells.

In the end regions (as viewed in the longitudinal direction) of the housing 10, shaft holders 13 are arranged, in each of which a pivot shaft of a piece of furniture, which is aligned in the z-direction, is mounted. For the insertion of the pivot shaft into the shaft holder 13, a respective detachable slide 14 is provided, which engages beyond the shaft holder 13. The slide 14 is pushed into correspondingly shaped and undercut grooves of the housing half-shells 11, 12. Insertion in the z-direction is preferably provided, wherein a latching between the slides 14 and the housing half-shells 11, 12 can additionally be provided.

The pivot shafts inserted into the shaft holders 13 have a pivot lever located inside the housing 10, which is acted on with force by the illustrated furniture drive, thereby rotating the pivot shafts for the adjustment of furniture parts. A typical application is provided by the illustrated furniture drive in connection with a slatted frame of a bed as a piece of furniture. The two pivot shafts are connected to a head part or a foot part of the slatted frame, which can be lifted or lowered accordingly by pivoting the pivot shafts. The furniture drive actuates the pivot shafts and is simultaneously fixed thereto. An additional fixing of the furniture drive to the furniture is not necessary. In operation, the furniture drive is essentially oriented such that the xz-plane extends horizontally and the xy-plane vertically.

Figure 3:
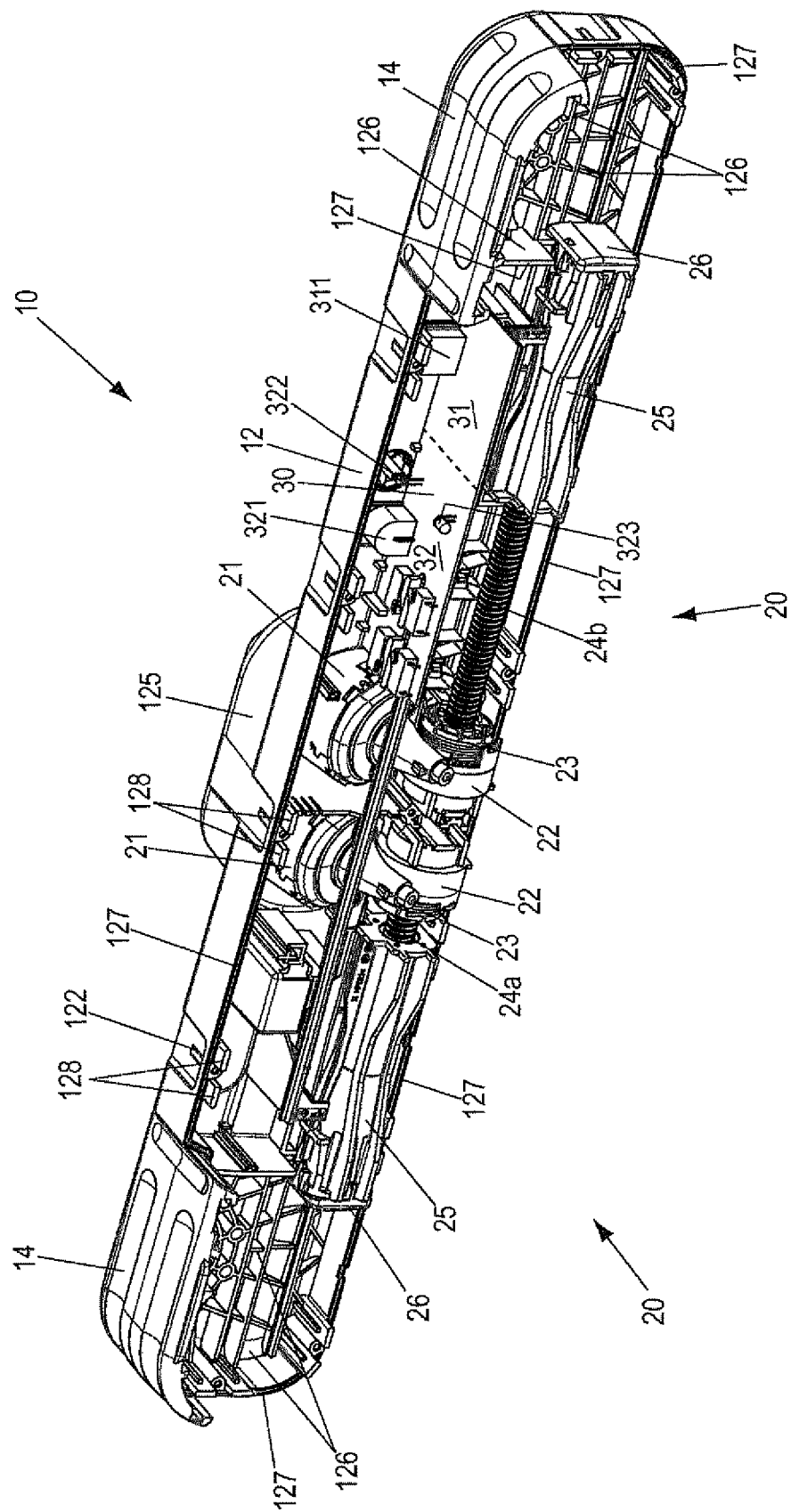
FIG. 3 shows an isometric view of the furniture drive of FIGS. 1 and 2 with open housing.
Figure 4:
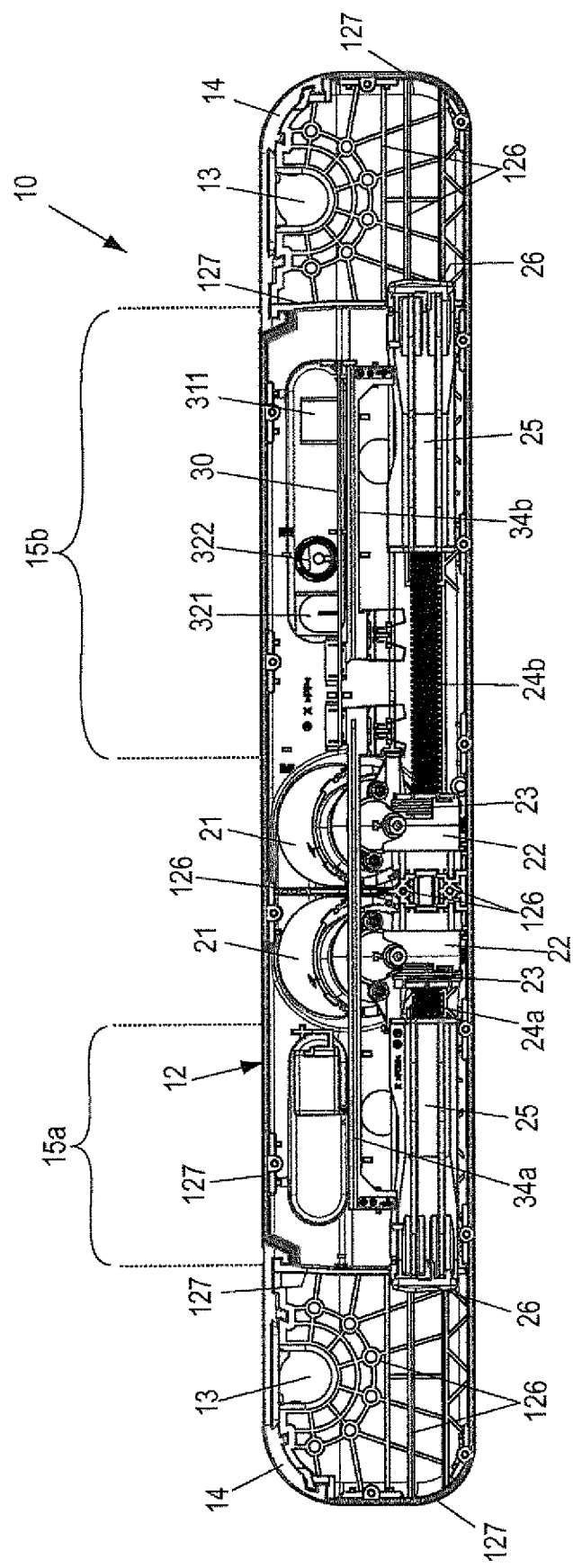
FIG. 4 shows a side view of the furniture drive of FIGS. 1 and 2 with open housing.

FIGS. 3 and 4 each show an overall view of the furniture drive of FIGS. 1 and 2, wherein the first housing half-shell 11 (see FIGS. 1, 2) is removed in order to provide an insight into the internal design of the furniture drive. FIG. 3 shows an isometric oblique view from the viewing angle which is also assumed in FIG. 1, FIG. 4 shows the furniture drive in a side view on the xy-plane.

The outer edges of the housing half-shells 11, 12 which rest on each other form abutting surfaces 127, which can be profiled in such a way that a seal of the two housing half-shells 11, 12 takes place with respect to one another. This is possible, for example, by forming tongue and groove on the abutting surfaces 127. In addition, the abutting surfaces 127 of the two housing half-shells 11, 12 can be glued together or an elastic seal can be interposed. If a connection of the two housing half-shells 11, 12 takes place by a welding process, e.g. the aforementioned hot-gas welding, a profiling, for example a chamfer, can be provided, which prevents a welding seam from protruding outwards, or by means of which a protruding portion is reduced.

In particular, stiffening ribs 126 are formed in the region of the shaft holders 13, which absorb forces applied to the edge of the shaft holder 13 from the pivot shafts and distribute them in the housing. Immediately around the shaft holder 13, the stiffening ribs 126 are held flat, since the pivot lever of the pivot shafts moves in this region. Where possible, for example adjacent to the end regions for the separation of the end regions and a central portion of the housing 10, stiffening ribs 126 are arranged which are so high that they contact stiffening ribs provided at the corresponding location in the first housing half-shell 11 (not shown here), so that abutting surfaces 127 are also formed here between the two stiffening ribs. In particular, if a joining process is also used for both housing half-shells 11, 12, in which a connection of the inner abutting surfaces 127 is also possible, for example during the aforementioned hot-gas welding, an increased stiffness of the housing 10 can be achieved.

In addition, centring lugs 128, which project into corresponding depressions of the first housing half-shell 11, are arranged in the region of the screw domes 122. If a welding process is used as a joining method, the housing half-shells 11, 12 can additionally be welded at these locations, as a result of which the size of the warping surface 11, 12 is further increased.

Two drive units 20 are arranged in the housing 10, each of which has an electric drive motor 21, which acts via a respective transmission 22 on a spindle 24a or 24b. Optionally, a brake 23 for the spindle 24a, b is arranged adjacent to the transmission 22, which in the present case is a respective wrap spring brake. A bearing, preferably a rolling bearing, is arranged in the housing of the transmission 22 for the spindle 24a, b.

The transmissions 22 are provided in this case in the form of a worm gear. A rotation of the drive shaft of the drive motor 21 is transmitted to a preferably helically geared gearwheel of the transmission 22 via a worm arranged on the drive shaft. Said toothed wheel is connected in a rotationally fixed manner to the respective spindle 24a, b, so that the latter can be rotated at the reduced speed by the drive motor 21. A pressure slide 25, into which the spindle 24a, b is inserted, is placed on the free end of the spindle 24a, b opposite the gear 22. The pressure slides 25 are each mounted in a slideable and displaceable manner in the x-direction in the housing 10, wherein the rotation of the pressure slides 25 is prevented by the mounting.

A spindle nut, which interacts with the spindle 24a, b, is arranged in a rotationally fixed manner in the interior of the pressure slide 25 and converts a rotation of the spindle 24a, b into a displacement movement of the corresponding slide 25. At the end of the spindle 24a, b, which faces the associated transmission 22, a pressure head 26 is placed on the pressure slide 25, against which the inserted pivot lever rests and transmits the force to this pivot lever in order to pivot the pivot shafts.

A specific displacement path for the pressure slides 25 is provided for both drive units 20. FIGS. 3 and 4 each show a fully retracted or approximately fully retracted position of the pressure slide 25 in which the latter is at least approximately fully retracted towards the centre of the housing 10 (viewed in the longitudinal direction x).

The two drive units 20 differ in the length of their spindles 24a and 24b. The length of the spindle 24a is selected such that the required displacement path is achieved by the pressure slide 25, and the drive motor 21 and the transmission 22 are simultaneously positioned as close as possible to the corresponding shaft holder 13.

The second drive unit 20, however, has a significantly longer spindle 24b, wherein the length of the spindle 24b, with given distance of the shaft holders 12, is selected in such a way that the drive motors 21 or transmissions 22 of the two drive units 20 are arranged essentially directly adjacent to one another in the housing 10. In the present case, for example, only one stiffening rib 126 is arranged between the two drive motors 21. Between the gears 22, several stiffening ribs 126 are arranged in the manner of a truss assembly.

The different length of the spindle 24a, b leads to a division of the space available in the housing 10, which advantageously differs from known structures of the interior of the housing of a dual drive. Apart from the end regions in which the shaft holders 13 are arranged, the interior of the housing 10 is divided into a first installation space 15a, which is located above the spindle 24a, and a second, larger installation space 15b above the spindle 24b.

In the case of dual drives known from the prior art, both drive units are designed with the shortest possible spindle, the length of which is comparable to that of the spindle 24a. As a result, the available interior space of the housing is divided—again apart from the end areas—into three installation spaces, one each above the spindles and one third installation space between the two drive motors Correspondingly, the installation space available in the housing according to the prior art is subdivided into roughly three equal sections, whereas, in the present case, it is subdivided according to the invention into only two sections, one of which, the installation space 15a, is comparable in size to the installation spaces from the prior art, while the other (installation space 15b) is approximately twice as large. Although the overall available space does not increase with the same length of the furniture drive, it is less subdivided, which offers greater freedom of design for the electrical and electronic components to be arranged in these installation spaces.

It is noted that, in the exemplary embodiment shown, the off-centre arrangement of the drive motors 21 is achieved by different lengths of the spindles 34a and 34b. Equivalent to this is an embodiment in which the spindles of both drive units are of the same length, but the output members, e.g. the pressure slides, are of different lengths. Combinations of both versions are also conceivable.

In the exemplary embodiment illustrated, a control board 30 is arranged in the larger of the two building walls 15b. The control board 30 has two areas, which are schematically separated from each other in FIG. 3 by a dashed line. In the part of the control board 30 shown on the right-hand side of FIG. 3, a power supply unit 31 is arranged, whereas a control device 32 is located in the area shown on the left in the drawing. The power supply unit 31 has a mains connection 311, into which a mains cable can be inserted from the outside. The power supply unit 31, whose electronic components are not shown on the control board 30 for the sake of clarity, is preferably a switched-mode power supply with a high-frequency transformer, which requires less space compared to a conventional low-frequency transformer, is lighter in weight and is more energy-efficient especially when idling. At an output of the power supply unit 31, a low voltage is provided, preferably a DC voltage in the range of 20-30 V (volts), e.g. nominally 24 V, with which the control device 32 and the drive motors 21 are supplied.

By forming the larger installation space 15b in accordance with the invention, a single control board 30 can be used, on which the power supply unit 31 and the control device 32 can be accommodated. The narrow, elongated configuration of the control board 30 allows a reliable separation of the mains voltage which is processed in the region of the power supply unit 31 and the low voltage which is fed to the control device 32.

The control device 32 comprises components for controlling the drive motors 21. Components of this type can be electromagnetic switching elements, such as relays, or semiconductor switches, for example MOSFET (Metal-Oxide Semiconductor Field-Effect Transistor) transistors or IGBT (Insulated Gate Bipolar Transistor) transistors. The switching elements either have a plurality of contact sets or are interconnected in the form of an H-bridge so that the direction of rotation of the drive motors 21 can be switched over.

The switching elements are controlled depending on input information of the control board 30, which are, for example, supplied by an external remote control, also called hand control. For this purpose, control connections 321, which are accessible from the outside, are arranged in the region of the control device 32. Furthermore, operating and/or display elements 322 are provided, which can have a sensing function, for example, in order to be able to reset functions of the control device 32. Beyond this, lighting devices 323, e.g. in the form of light-emitting diodes, can be arranged on the control board 30, which illuminate the surroundings of the electromotive drive unit through corresponding openings or windows in the housing half-shells 11, 12. In this way, for example, floor lighting can be implemented, which is active for a certain time after actuation of a corresponding button on the remote control, so that a night-time getting up is facilitated without having to switch on room lighting.

Furthermore, limit switches 33 are arranged on the control board 30, which are actuated by the tow rods 25 by means of the pressure slides 34. The limit switches 33 prevent a movement of the pressure slides 25 outside of a permissible range in order to prevent a mechanical stop of the pressure slide 25 on the housing 10 or on the transmission 22 or the brake 23, or in order to prevent a contact between the end of the spindle 24a, b and the pressure plate 26 inside the pressure slide 25. The arrangement of the limit switch 33 directly on the control board 30 reduces the wiring effort that would otherwise occur directly in the area of the pressure slide 25 when positioning the limit switches. The transmission of the movement or position of the pressure slides 25 on the limit switches 33 via the tow rods 34 is explained in more detail below in conjunction with FIGS. 5 to 7.

Figure 5:
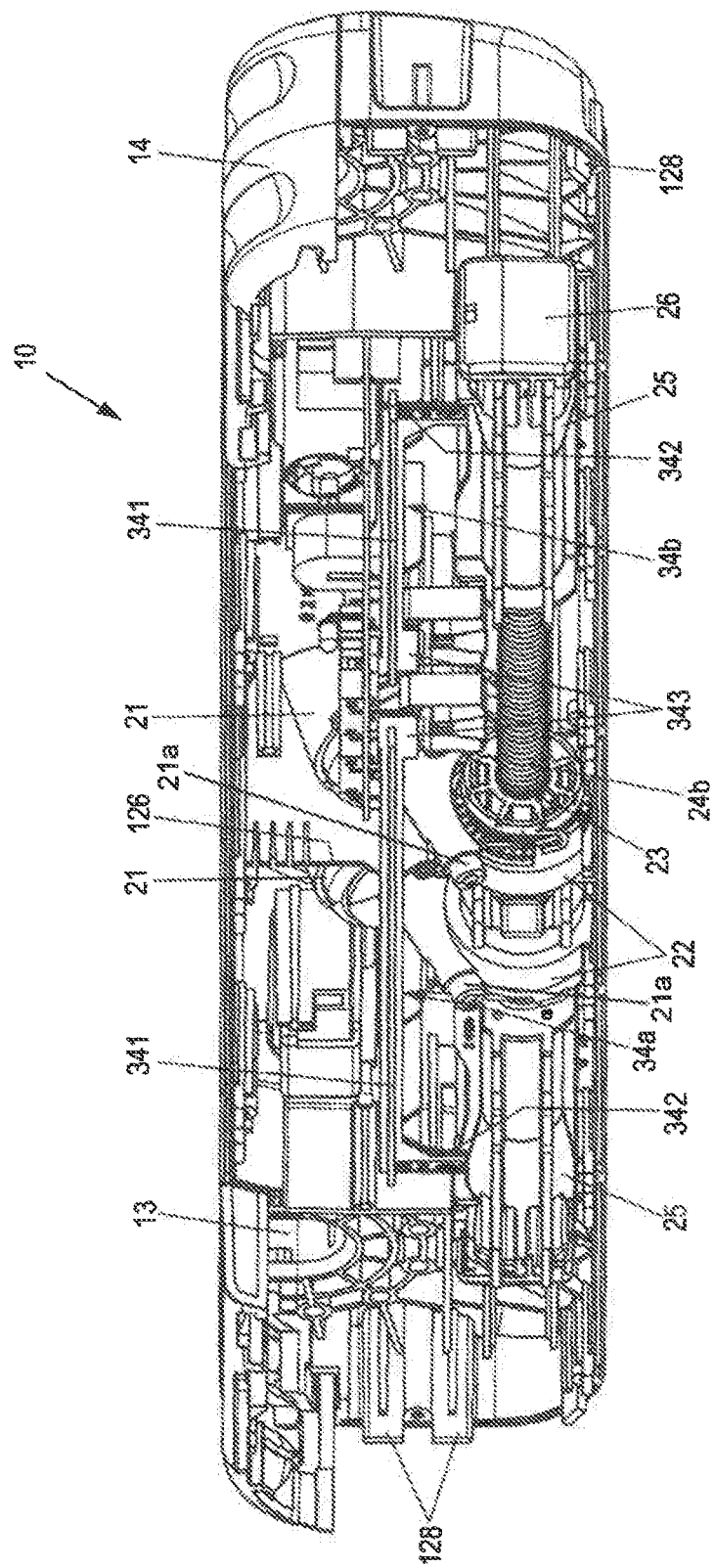
FIG. 5 shows a further isometric view of the furniture drive of FIGS. 1 and 2 with open housing.
Figure 6:
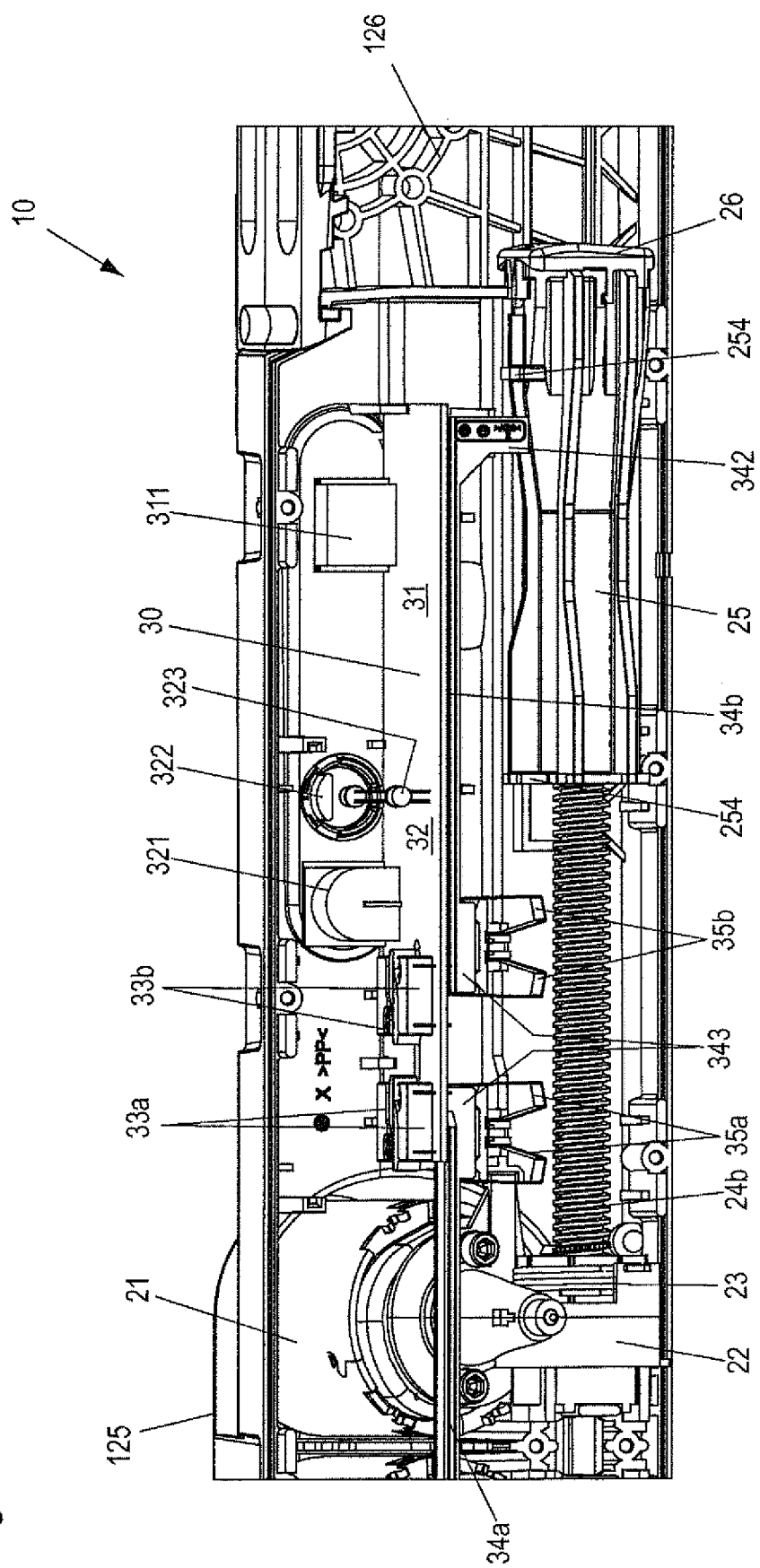
FIGS. 6 to 8 each show an isometric detailed view of the furniture drive.
Figure 7:
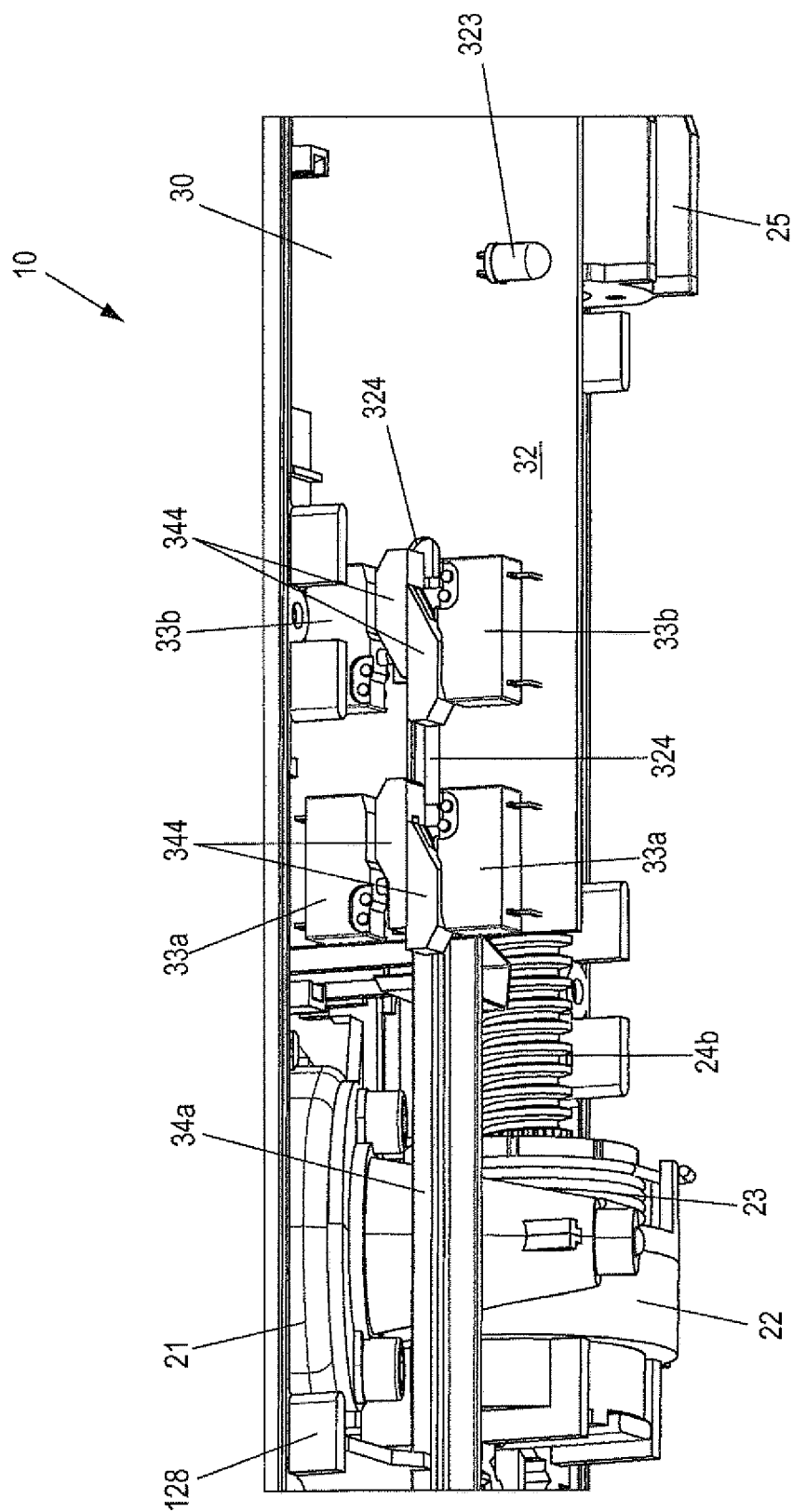
Figure 8:
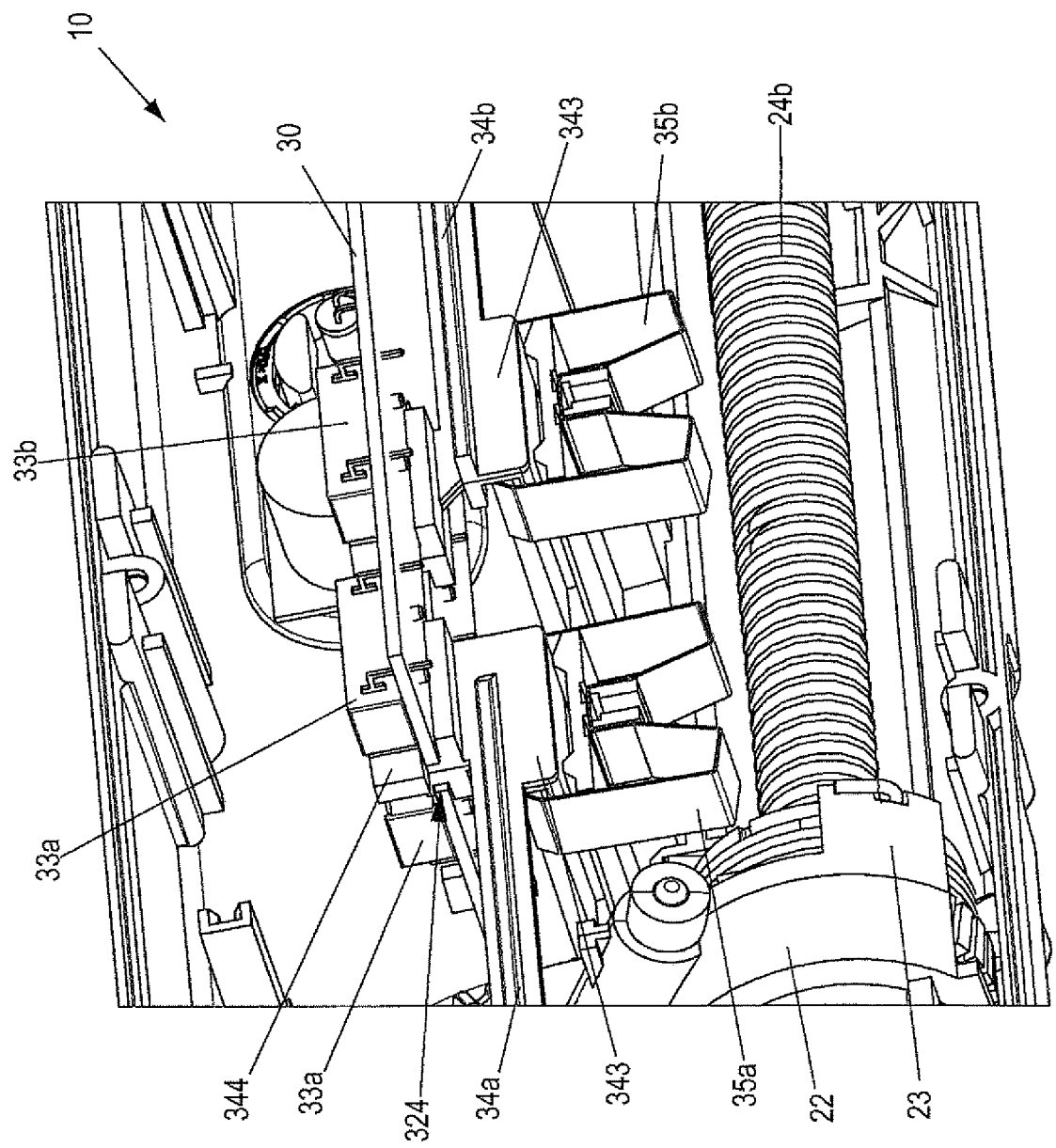

FIG. 5 shows an isometric oblique view of the electromotive furniture drive from a lateral oblique position. FIG. 6 shows in a likewise isometric view a section of the furniture drive in the area of the control board 30 in a side view slightly oblique from the top. FIGS. 7 and 8 are detailed views of the furniture drive on the area of the control device 32 of the control board 30 with regard to the upper side of the control board 30 in FIG. 7 and the underside of the control board 30 in FIG. 8.

In FIGS. 5 to 8, the first housing half-shell 11 (see FIGS. 1 and 2) is again removed, as in FIGS. 3 to 4.

Each of the drive units 20 is assigned a tow rod 34a or 34b. In the exemplary embodiment shown, the tow rods 34a, b are integrally made from plastic in an injection-moulding process. In order to provide sufficient pressure stability despite the length of the tow rods 34a, 34b and to allow a rotation-free guidance within the housing 10, the tow rods 34a, 34b are provided with guide webs 341 extending in the longitudinal direction. Stiffening ribs 126 in the region of the tow rods 34a, b are formed in the housing half-shells 11, 12 in such a way that they form a guide for the tow rods 34a, b, in which the tow rods 34a, 34b are displaceably guided in their longitudinal direction. The tow rods 34a, b extend essentially parallel to and above the spindles 24a, b. A downwardly projecting driver 342 is formed on each of its ends, which protrudes into the displacement path of the pressure slides 25 and is also moved by transverse ribs 254 which are formed on the pressure slides 25 when the pressure slides 25 are positioned just before the one or the other end of their allowable displacement path.

At the opposite end of the respective tow rod 34a, b, a likewise downwardly directed spring cam 343 is formed. In the region of the spring cam 343, a restoring spring 35a, b is arranged on the housing 10 and consists of a W-shaped bent spring plate, which is fixed in a central region on the housing 10 and rests with lateral spring arms on the side edges of the spring cam 343. In addition, a stop for the spring arms is provided on the housing 10, which prevents each of the spring arms from moving outwards, but not further inwards than in the illustrated neutral position.

In the neutral position of the tow rods 34a, 34b, which is clearly recognizable in FIG. 6 for example, the spring cam 343, depending on the design of the stop for the spring arms on the housing 10, is either not subjected to a spring force or is likewise actuated from both sides by the spring arms of the restoring spring 35a, b with a spring force so that a force acting in one or other direction of the tow rod 34a, b is not exerted in total by the restoring spring 35a, b.

When the tow rod 34a, b is moved in one direction or the other, a restoring force acting in the direction of the neutral position is respectively exerted by the restoring spring 35a, b by a respective one of the two spring arms on the spring cam 343. Correspondingly, the tow rod 34a, b assumes the neutral position shown by the restoring spring 35a, b, unless the driver 342 is deflected in one or the other direction by one of the transverse ribs 254 of the pressure slide 25.

Switching cams 344 are formed on the upper side of the tow rods 34a, b in the respective end area in which the spring cams 343 are located. The rod-shaped section of the tow rods 34a, b as well as the spring cams 343 are arranged below the control board 30, while the switching cams 344 are located on the upper side of the control board 30. For this purpose, the tow rods 34a, b have an upwardly facing longitudinal web, from which the switching cams 344 protrude laterally. A slot-shaped recess 324 is introduced into control board 30 for guiding through the longitudinal web. The slot-shaped recess 324 is open towards the outside in relation to the side of the control board 30 shown in the left in FIG. 7. When the furniture drive is installed, the tow rods 34b, 34a can be threaded into the slot-shaped recess 324 in this order. In addition to the guides for the tow rods 34a, b formed in the housing 10, the slot-shaped recess 324 also forms a guide for the tow rods 34a, b in conjunction with the longitudinal webs carrying the switching cams 344.

On the upper side of the control board 30, end position switches 33a and b, which are actuated by the switching cams 344, are arranged in the region of the switching cams 344. Two end position switches 33a and 33b are provided for each of the drive units 20, wherein the end position switches 33a, b are arranged and the switching cams 344 are designed and arranged in such a way that, in the respective neutral position of the tow rods 34a, b, none of the limit switches 33a, b is actuated. If the respective tow rod 34a, b is deflected into one of the directions, a respective one of the two end position switches 33a or the two end position switches 33b is actuated.

In an alternative embodiment of the tow rod 34a, b, it is designed in several parts. In this case, the rod-shaped section consists of a rigid rod, e.g. formed from a wire section. A first end of the wire is connected to a body which corresponds to the previously described spring cam and the switching cams. The second end of the wire is bent in an angled manner and forms the driver. Further, alternatively, the aforementioned driver is connected to the second end of the wire.

On the control board 30, the end position switches 33a, b are connected to the switching elements for controlling the drive motors 21 in such a way that a further operation of the respective drive motor 21 is prevented upon reaching one of the end positions, while retraction of the drive motors 21 is still possible. For this purpose, a diode which is connected in parallel to the switching contacts of the end position switch 33a, b can, for example, be assigned to each of the end position switches 33a, b.

The smaller installation space 15a, which is not occupied by the control board 30, is available for further electrical or electronic components. Optionally, for example, a battery compartment can be arranged in the installation space 15a into which externally accessible batteries can be inserted, which during a power failure at least temporarily supply current to the electromotive furniture drive in order to enable emergency travel to a desired basic position. As an alternative to an externally accessible battery compartment, rechargeable batteries can also be provided for the emergency drive in the installation space 15a, which need not be accessible from the outside and which via the control board 30 can be held to a full charge state by means of a charge control circuit.

Furthermore, receive modules for a wireless remote control or further optional additional modules, with which the functionality of the control device 32 is supplemented, can be accommodated for example in the installation space 15a. In addition or alternatively, connectors can also be provided on the control board 30, into which supplementary boards can be inserted vertically or parallel to the control board 30.

FIG. 5 also shows that the shafts 21a of the drive motors 21 do not run parallel to the pivot shafts, but are tilted in relation thereto about approximately 20 to 25 degrees in the yz plane. The tilting is selected in such a way that a rear end of the motor housing of the drive motors 21 does not protrude upwardly over the other structural height of the furniture drive. Nevertheless, the tilting reduces the width of the furniture drive in the z-direction. In this way, the motor domes 125 extend less far over the side face 123 than would be the case with the alignment of the motor axis along the z-direction.

FIG. 8 shows a detailed drawing of the pressure slide 25 as well as the pressure head 26 in an isometric view. The pressure head 26 is shown separately from the pressure slide 25 in this drawing.

The pressure slide 25 is preferably an integral or multi-piece plastic component, which is made of a highly resilient and break-resistant plastic, for example POM (polyoxymethylene). In the present case, the pressure slide 25 is composed of two elements, i.e. a hollow main body 251 and a spindle nut insert 253. On the main body 251, guide webs 252 project outwards in the longitudinal direction, which additionally serve to stiffen the base body 251.

The spindle nut insert 253 is inserted into an end region of the base body 251. A threaded section is formed centrally in the spindle nut insert 253, which serves as a spindle nut for the spindle 24a, b. The threaded section projects into the interior of the base body 251. The spindle nut insert 253 projects plate-like beyond the opening in the base body 251 on the exterior shown in FIG. 8 and rests on its end face. In this way, great forces can be transmitted from the spindle nut insert 253 to the base body 251. In an alternative embodiment of the pressure slide 25, the latter is integral. The base body 251 and the spindle nut insert 253 are then integrated in one element. The plate of the spindle nut insert 253 also provides a transverse rib 254 which protrudes outwards beyond the base body 251 and serves as a stop for the driver 342 of the tow rod 34a, b. For this purpose, a further transverse rib 254 is formed on the opposite side of the base body 251.

The basic shape of the base body 251 varies along its longitudinal extension from a hollow cylinder on the side of the spindle nut insert 253 to a hollow cone on the opposite end of the base body 251. The transition between the two basic shapes takes place approximately in the centre of the base body 251. The diameter of the base body 251 expands towards the end opposite the spindle nut insert 253.

The pressure head 26 is inserted into the widened opening of the base body 251. It comprises a pressure plate 261 with an outwardly facing pressure surface 262, with the pivot lever of the pivot shaft of the furniture resting thereon. On the opposite side of the pressure plate 261, a connection piece 264 is formed, which protrudes into the opening of the base body 251 of the pressure slide 25. The pressure plate 261 protrudes outwardly beyond the connection piece 264 so that a bearing surface 263 is formed with which the pressure head 26 rests against a bearing surface 255 on the end face of the pressure slide 25. The pressure head 26 and pressure slide 25 latch into each other, wherein, in the present example, latching hooks 265 are formed on the pressure head 26, which are inserted in latching guides 256 and are latched in each case at rearwardly projecting latching projections 257.

The geometry and dimensions of the connection piece 264 are selected in such a way that the pressure head 26 can be displaced laterally in the z-direction relative to the pressure slide 25. When moving, the pressure head 26 does not carry out a linear motion but a pivoting movement. This is achieved by corresponding shaping of the bearing surface 255 of the base body 251 on the one hand and of the bearing surface 263 of the pressure head 26 on the other hand. The bearing surface 255 of the pressure slide 25 is concave in the z-direction, whereas the bearing surface 263 of the pressure head 26 is convex in the z-direction. The pivoting movement allows angular compensation if a pivot lever with its bearing surface is not aligned exactly along the z-direction.

The possible angular movement is shown in FIG. 10 in a top view onto the end region of the pressure slide 25 with the mounted pressure head 26 in three partial images. In the middle partial figure (b) of FIG. 10, the pressure head 26 is located in a middle position relative to the pressure slide 25. To enable movement of the pressure head 26, the latching hook guide 256 is formed in a somewhat wider manner than the width of the latching hook 265 itself. In the partial figure (b), the latching hook 265 is located centrally in the latching hook guide 256. The left-hand partial figure (a) shows the pressure plate 26 deflected and pivoted to the left as viewed from the pressure slide 25. The partial figure (c) shows the pressure plate 26 pivoted to the right, as viewed from the pressure slide 25. The clearance which the latching hook 265 has in the latching hook guide 256 is thus adapted to the clearance of the connection piece 264 in the opening of the base body 251, such that a stop for the pressure head 26 is preferably formed by the abutment of the connection piece 254 on the wall of the base body 251, since said stop can absorb larger forces than the latching hook 265.

As can be seen particularly well in FIG. 5, the pressure surface 262 of the pressure head 26 can also not be flat. In the present case, the pressure surface 262 is slightly chamfered in the upper region in order to prevent an abutment of this portion of the pressure surface 262 on the pivot shaft or the pivot lever.

From the extension of the spindle 24b with respect to the spindle 24a and the correspondingly modified arrangement of the drive motors 21 and gears 22 with respect to each other, an advantage is also obtained in the packaging of several of the electromotive furniture drives shown, compared with the state of the art. Due to the extension of the spindle 24b in relation to the spindle 24a, the drive motors 21 are positioned close to one another so that a single motor dome 125 can be formed on the second housing half-shell 12, which comprises both housings of the drive motors 21. Said motor dome 125 is additionally not arranged at the centre on the longitudinal side of the housing 10, but is arranged off-centre. The off-centre arrangement makes it possible to position two furniture drives with respective second housing half-shells 12 facing one another within a packaging unit, wherein only a small displacement of the furniture drives relative to one another or, depending on the geometry, no displacement at all needs to take place in the longitudinal direction.

Figure 11:
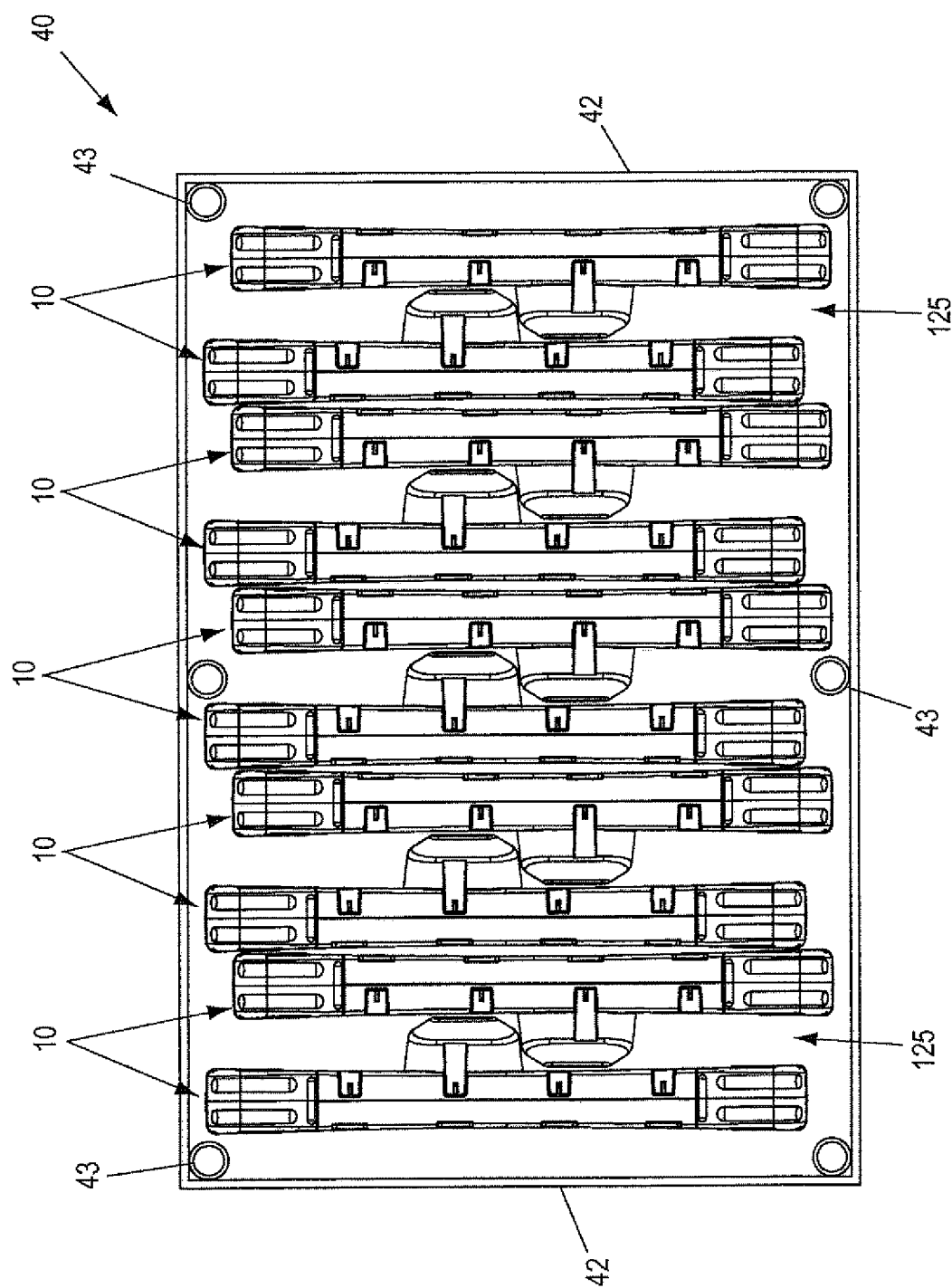
FIG. 11 shows a top view of the number of furniture drives in a packaging unit.

This is illustrated in FIG. 11 by way of example for ten furniture drives arranged in pairs in a layer of a packaging unit 40. As a result of the off-centre arrangement of the motor domes 125 on the housing 10 of the furniture drives, they can be arranged in pairs nested into each other, without being displaced to any noteworthy extent relative to one another in the longitudinal direction. In this way, the available storage space in the packaging unit 40 is optimally utilized. In the illustrated example, the packaging unit 40 is based on a euro palette 41 on which a cardboard box 42 is placed. In the cardboard box 42, several of the illustrated layers of furniture drives can be seen packaged one above the other. In order to be able to optionally stack two or more packaging units 40 on top of one another, vertical support rollers 43 are disposed in the interior of the cardboard box 42 and can, for example, consist of cardboard material like the cardboard box 42.

What is claimed is:

1. An electromotive dual drive for adjustment of two different furniture parts of a piece of furniture, said electromotive dual drive comprising:
    a housing having opposite end sections, each end section formed with a shaft holder for receiving a pivot shaft of the piece of furniture; and
    two drive units arranged one behind another in the housing in a longitudinal direction, each of said drive units including a drive motor, a transmission, and a spindle drive including a spindle which is operably connected to the pivot shaft of the piece of furniture, wherein the spindle of one of the drive units and the spindle of another one of the drive units are sized of different lengths, and the drive motor of the one of the drive units and the drive motor of the other one of the drive units are spaced from the shaft holders for the pivot shafts at different distances, wherein the housing includes a first and second installation spaces formed adjacent to the spindles of the drive units, respectively, with one of the first and second installation spaces being larger than another one of the first and second installation spaces;
    a control board arranged in the larger one of the first and second installation spaces;
    a power supply unit and a control device which are arranged on the control board and operably connected to the drive motor of the one of the drive units and the drive motor of the other one of the drive units;
    end position switches arranged on the control board for switching off the drive motor of the one of the drive units and the drive motor of the other one of the drive units, when output members of the drive units approach a limit of a displacement path thereof;
    tow rods coupling the end position switches to the output members, respectively, wherein the output member of each of the drive units is linearly displaceable between a fully retracted position and a fully extended position, said output members deflecting the tow rods out of a neutral position into one direction or an opposite direction, when approaching the fully retracted position or the fully extended position; and
    restoring springs acting on the tow rods, respectively, to return the tow rods back into the neutral position when deflected in the one direction or the opposite direction.

2. The electromotive dual drive of claim 1, wherein the drive motor of the one of the drive units and the drive motor of the other one of the drive units are arranged adjacent to each other.

3. The electromotive dual drive of claim 2, wherein the housing includes stiffening ribs arranged between the drive units in a spaced-apart relationship.

4. The electromotive dual drive of claim 2, further comprising a motor dome formed on a side face of the housing to cover any section of the two drive motors that projects beyond the side face of the housing.

5. The electromotive dual drive of claim 4, wherein the drive motor of each of the drive units includes a drive shaft configured to extend obliquely in relation to the side face of the housing.

6. The electromotive dual drive of claim 1, wherein each of the tow rods includes a driver which is co-moved by a stop on the associated one of the output members.

7. The electromotive dual drive of claim 6, wherein the output member of each of the drive units is a pressure slide with a pressure head, with a spindle nut being inserted into or formed in the pressure slide.

8. The electromotive dual drive of claim 1, wherein the restoring springs are each configured as a W-shaped spring with two spring arms and fixed in a central region to the housing.

9. The electromotive dual drive of claim 1, wherein the tow rods each have switching cams for actuating the end position switches upon deflection.

10. The electromotive dual drive of claim 9, wherein the control board has a slot-like recess for guiding the tow rods, said switching cams being arranged on one side of the control board, with other sections of the tow rods being arranged on an opposite side of the control board.

11. The electromotive dual drive of claim 1, wherein the tow rods are guided in a linearly displaceable manner by elements of the housing or by the control board.

\* \* \* \* \*